United States Patent [19]

Moulinet

[11] Patent Number: 5,033,875
[45] Date of Patent: Jul. 23, 1991

[54] SUPPORT BEARING OF A ROTARY SHAFT
[75] Inventor: Francois Moulinet, Triel S/Seine, France
[73] Assignee: Glaenzer Spicer, Poissy, France
[21] Appl. No.: 430,605
[22] Filed: Nov. 2, 1989
[30] Foreign Application Priority Data
Nov. 16, 1988 [FR] France ................. 88 14889
[51] Int. Cl.[5] ................................... F16C 27/06
[52] U.S. Cl. ..................... 384/536; 384/582
[58] Field of Search ............... 384/535, 536, 581, 582, 384/99

[56] References Cited

U.S. PATENT DOCUMENTS

| 2,283,839 | 5/1942 | Wright | 384/536 |
|---|---|---|---|
| 2,521,638 | 9/1950 | Lamm | 384/536 |
| 3,018,146 | 1/1962 | Euwe et al. | |
| 3,447,846 | 6/1969 | Marsh | 384/536 |
| 4,229,055 | 10/1980 | Olschewski et al. | 384/536 |

FOREIGN PATENT DOCUMENTS

| 1036487 | 8/1958 | Fed. Rep. of Germany . |
| 3719795 | 12/1988 | Fed. Rep. of Germany . |
| 1461844 | 12/1965 | France . |
| 2404378 | 4/1979 | France . |
| 979599 | 1/1965 | United Kingdom . |

Primary Examiner—Thomas R. Hannon
Attorney, Agent, or Firm—Wenderoth, Lind & Ponack

[57] ABSTRACT

A support bearing of a rotary shaft, of the type comprising an inner ring (12) and an outer ring (10) coaxial with one another and elastic connecting strips (14a, 14b) between the two rings.

The connecting strips comprise a series of first elastic strips (14a) which connect a first edge (10a) of the outer ring (10) to an axially opposite first edge (12a) of the inner ring (12), in such a way that the mid-plane of each of the first strips (14a) forms a first angle (A) with the axis (X—X) common to the two rings, and a series of second elastic strips (14b) which connect the second edge (10b) of the outer ring (10) to the second edge (12b) of the inner ring (12), in such a way that the mid-plane of each of the second strips forms a second angle (B) with the common axis (X—X).

The invention is used particularly for supporting a motor-vehicle transmission shaft.

14 Claims, 4 Drawing Sheets

SUPPORT BEARING OF A ROTARY SHAFT

The subject of the present invention is a support bearing of a rotary shaft, of the type comprising an inner ring and an outer ring coaxial with one another and elastic connecting means between the two rings.

The invention relates more particularly to a support bearing of a transmission shafting used in the construction of motor vehicles. This type of shafting is generally used for the longitudinal transmission linking the engine unit to the power divider of a four-wheel drive vehicle or to the rear axle casing of a rear-wheel drive vehicle. However, its use is not limited to this particular instance, and it can be employed in any other sector where it is necessary to ensure the vibrational insulation of a shaft rotating in relation to the structure to which it is secured.

The bearings of a known type which are generally used in motor-vehicle construction receive a ball bearing, and elastic means are designed in the form of an annular block of elastomeric material, such as natural rubber in particular, which connects the ball bearing to a support housing.

This type of bearing does not make it possible to provide elastic characteristics which are different and controlled in the axial and radial directions and which can be adapted to the various stresses to be overcome and/or to the various vibrations to be prevented from being transmitted to the vehicle structure. This problem is particularly acute in a transmission adopting a shafting which is in two portions of a given mass and which is arranged between two end gaskets very freely slidable axially.

In fact, in this case, the shafting has to be held virtually rigidly in the axial direction, whereas it is desirable to have a support bearing which possesses very high flexibility, and therefore excellent damping characteristics in the radial direction, to prevent the vibrations of the rotating shaft from being transmitted to the chassis and passenger cell of the vehicle.

The object of the invention is, therefore, to provide a support bearing of a rotary shaft, having dynamic damping characteristics which are adapted and different in the axial and radial directions.

To achieve this, the invention provides a support bearing, characterized in that the connecting means comprise a series of first elastic strips which connect a first edge of the outer ring to an axially opposite first edge of the inner ring, in such a way that the mid-plane of each of the first strips forms a first angle with the axis common to the two rings, and a series of second elastic strips which connect the second edge of the outer ring to the second edge of the inner ring, in such a way that the mid-plane of each of the second strips forms a second angle with the said common axis.

According to other features of the invention:

each of the two series of elastic strips comprises an identical number of elastic strips;

the strips of each of the two series alternate about the common axis;

the first and second elastic strips are angularly distributed uniformly about the common axis;

at least one of the two series of strips has at least one group of several strips arranged consecutively about the common axis;

the first angle and the second angle are equal;

the first angle and second angle are different;

each strip has a length at rest which is equal to the distance separating the two edges which it connects;

each strip has a length at rest which is greater than the distance separating the two edges which it connects;

the strips and the rings are produced from the same material;

the strips and the rings are produced in one piece;

the connecting means also comprise at least one series of hydro-elastic chocks which connect the mutually confronting cylindrical surfaces of the two rings to one another; and each of the hydro-elastic chocks is arranged between two consecutive elastic strips.

Other features and advantages of the invention will emerge from a reading of the following detailed description, for an understanding of which reference will be made to the accompanying drawings in which:

FIGS. 1 to 3 show a support bearing of a rotary shaft (not shown), comprising an outer annular cylindrical ring 10 and an inner annular cylindrical ring 12 which, at rest, are arranged coaxially about their common axis X—X.

Figure 1:
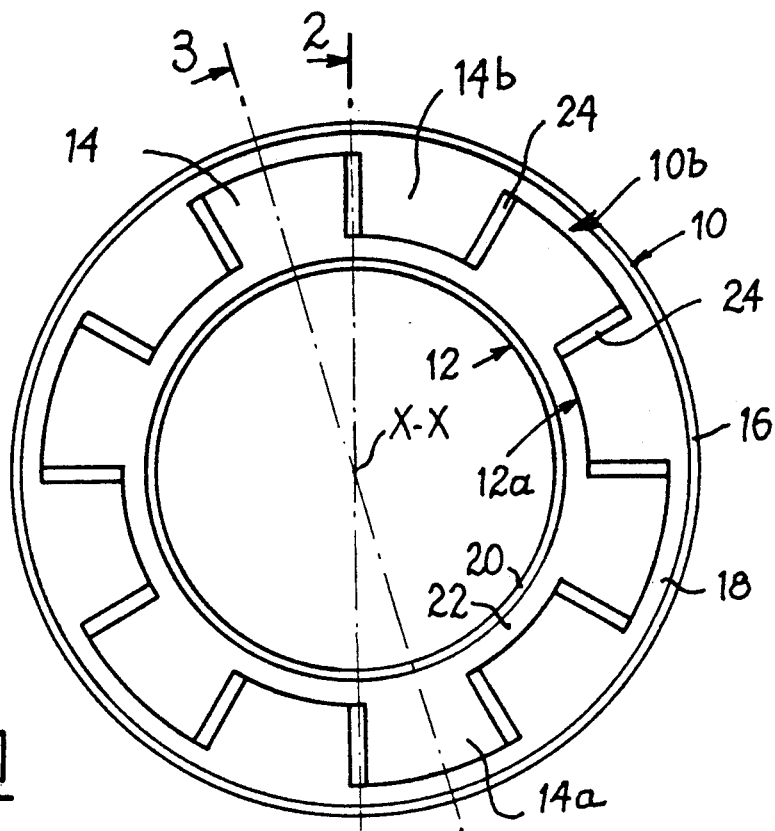
FIG. 1 is an elevation view of a first embodiment of a support bearing produced according to the teachings of the invention.

According to the invention, the two rings 10 and 12 are connected to one another by means of two series of elastic strips.

A first edge 10a of the outer ring 10 is connected to the axially opposite edge 12a of the inner ring 12 by means of a first series of six elastic strips 14a.

Each of the strips 14a is tensioned between the two edges 10a and 12a which it connects to one another, that is to say its length is substantially equal to the distance separating its two edges.

The mid-plane of each of the strips 14a forms an angle A with the common axis X—X.

In a symmetrical arrangement the second edge 10b of the outer ring 10 is connected to the axially opposite second edge 12b of the inner ring 12 by means of a second six elastic strips 14b.

In this embodiment, the elastic strips 14a and 14b are of an identical number, alternate and are angularly distributed uniformly about the axis X—X, so as to delimit between two consecutive strips 14a and 14b an open space 24 which extends in a radial plane containing the axis X—X.

The outer ring 10 consists of an annular metal ring 16 lined with a ring made of elastomeric material or thermoplastic 18. In the same way, the inner ring 12 comprises an annular metal ring 20 lined with a ring made of elastomeric material or thermoplastic 22.

Figures 2, 3:
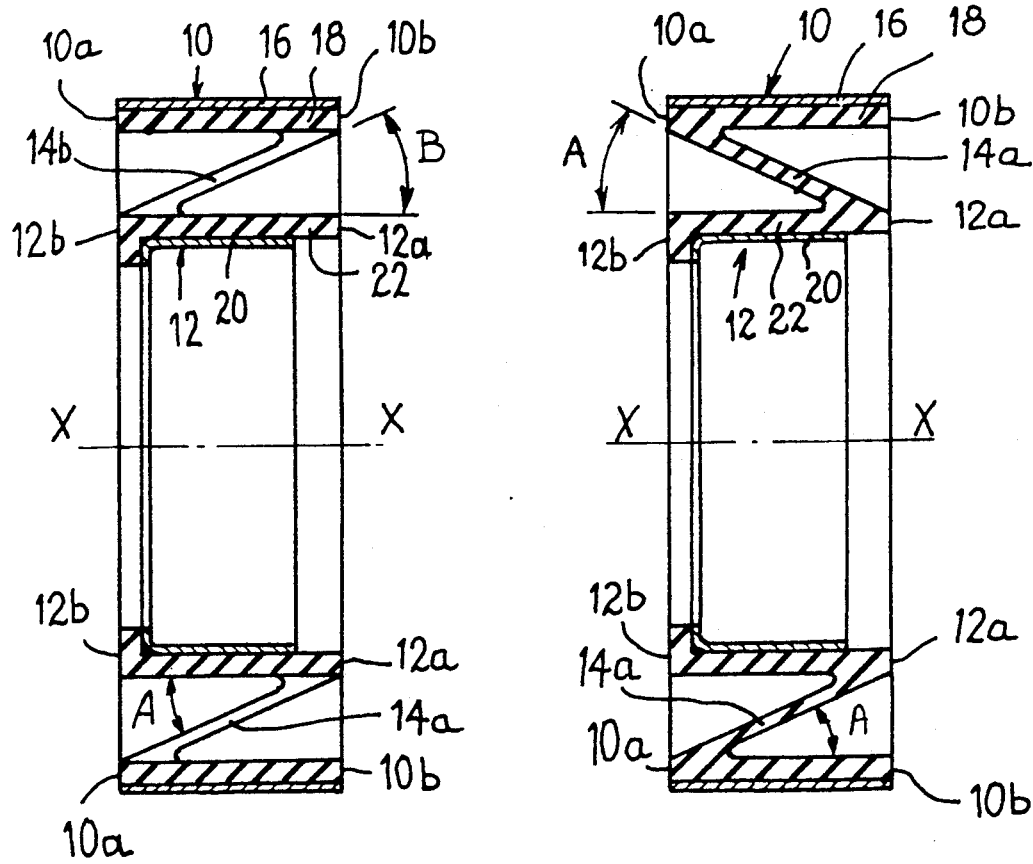
FIG. 2 is a sectional view along the line 2—2 of FIG. 1.
FIG. 3 is a sectional view along the line 3—3 of FIG. 1.

In the embodiment illustrated in FIGS. 1 to 3, the elastic strips 14a and 14b and the outer and inner rings 18 and 22 made of elastomeric material or thermoplastic are in one integrally moulded piece.

The metal rings 16 and 20 are fastened to the rings 18 and 22 by adhesive bonding or glueing.

Figure 4:
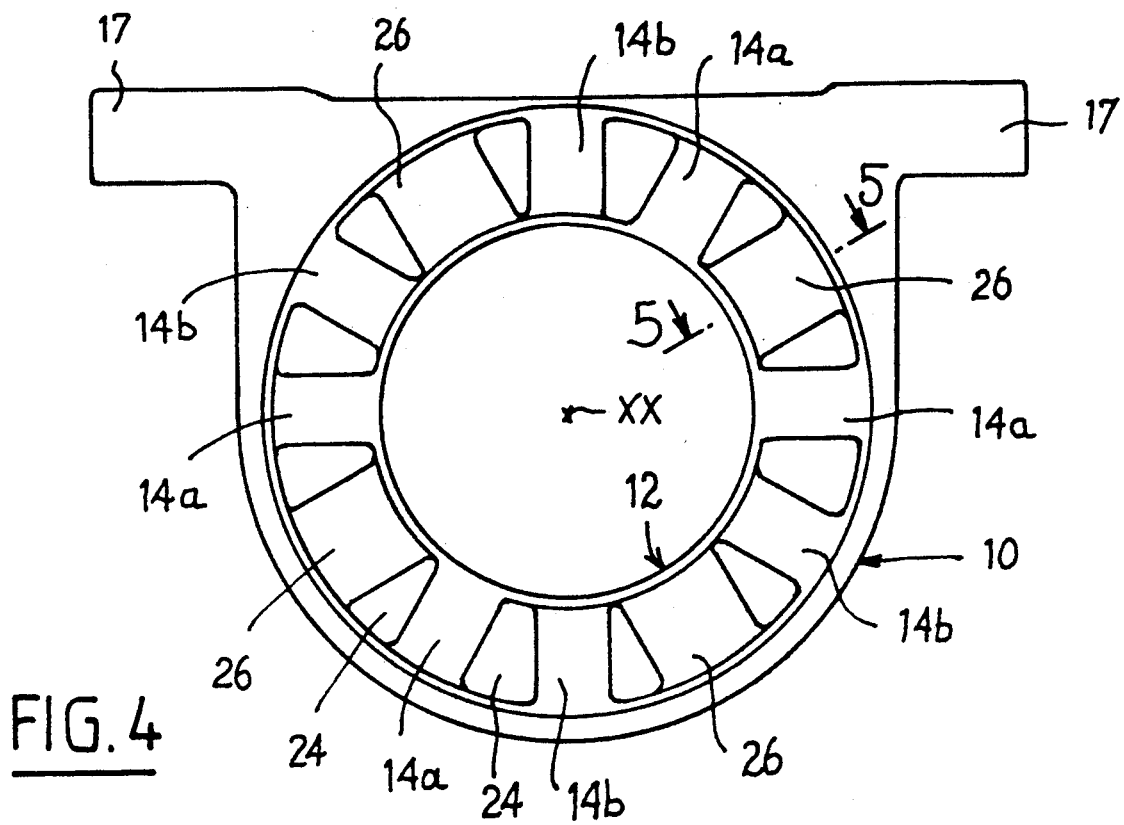
FIG. 4 is an elevation view of a second embodiment of a support bearing according to the invention, in which the elastic connecting means include a series of hydro-elastic chocks.

FIG. 4 shows a second embodiment of a support bearing. The same reference numerals are used to denote elements identical or equivalent to those illustrated in FIGS. 1 to 3.

The support bearing shown in FIG. 4 differs from the preceding one in that the outer ring 10 has two integrally produced fastening flanges 17 which are of forms and dimensions suitable for the particular requirements and which make it possible, for example, to connect such a support bearing to the lower face of the floor of a motor vehicle in order to ensure the retention of a transmission shaft.

In FIG. 4, there are once again elastic connecting means between the rings 10 and 12, consisting of two series of elastic strips 14a and 14b of which there are four in each series here.

As can be seen, both the elastic strips of the first series 14a and the strips 14b are arranged in pairs about the axis X—X.

According to a feature of the invention, a hydro-elastic chock for connection between the rings 10 and 12 is provided between two consecutive strips of the same series 14a or 14b.

Figure 5:
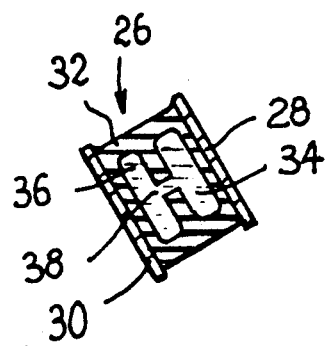
FIG. 5 is a sectional view of one of the hydro-elastic chocks along the line 5—5 of FIG. 4.

There are therefore four hydro-elastic chocks 26 which each comprise an outer plate 28 and an inner plate 30 connected to one another by means of a block of elastomeric material 32, inside which are formed two fluid-filled chambers 34 and 36 communicating with one another via an orifice of small cross-section 38. The illustration of such a hydro-elastic chock given in FIG. 5 is purely diagrammatic and is intended merely to call to mind the structural principle of such elements, but is in no way limiting as regards the type of hydro-elastic chock which can be employed in this application to a support bearing according to the invention.

The use of such hydro-elastic chocks makes it possible to modify further the radial characteristics of the support bearing.

The mode of operation of the shaft supports produced according to the teachings of the invention will now be described.

Figure 6A:
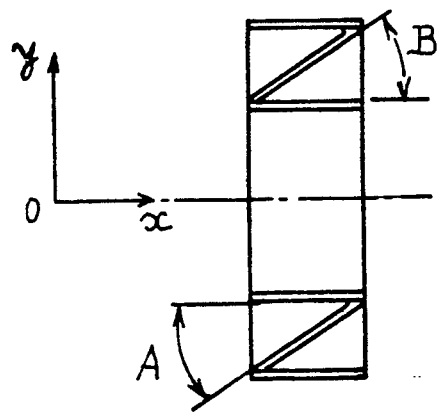
FIGS. 6A, 6B and 6C are diagrams making it possible to illustrate the difference between the axial and radial rigidities of a support bearing in which the angles of the strips are equal to 45°.

As regards a support of which the two series of strips are identical and form angles A and B substantially equal, for example, to 45°, as shown in FIG. 6A, the characteristics of axial and radial rigidity Fx and Fy can be identical.

It will readily be appreciated that, if a transmission shaft is fastened to the inner ring of the support, any stress exerted on the latter parallel to its axis X—X, that is to say in the direction Ox, causes a tensioning of the series of corresponding strips which oppose any shift of the transmission shaft, the support bearing thus ensuring that the shaft is immobilized axially.

Figure 7A:
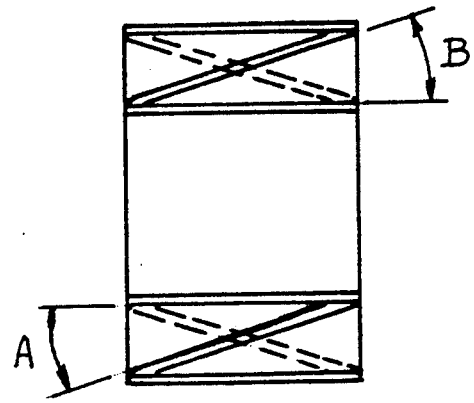
FIGS. 7A, 7B and 7C are diagrams, similar to those of FIGS. 6A, 6B and 6C, for a support bearing in which the angles of the strips are less than 45°.
Figure 6B:
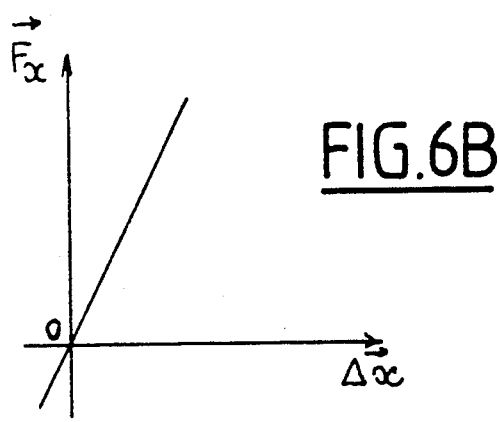
Figure 7B:
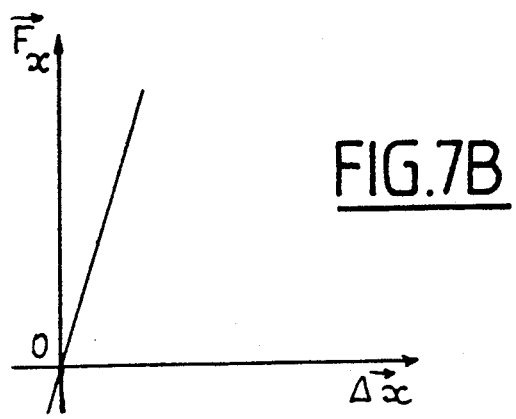
Figure 6C:
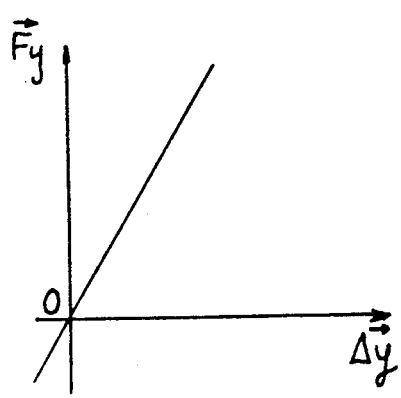
Figure 7C:
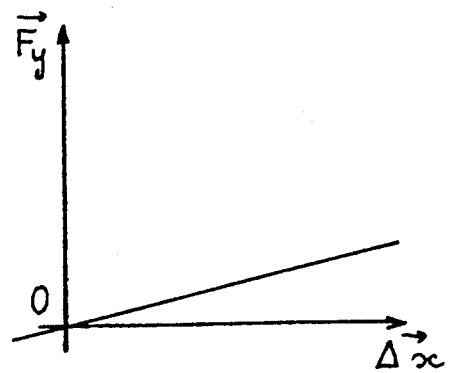

FIGS. 7A to 7C illustrate the behaviour of a support bearing, the two series of strips of which are identical and of angles A and B both equal to approximately 30°.

As can be seen, the axial rigidity of the support bearing is clearly higher than the radial rigidity Fy, the latter making it possible to obtain an excellent filtration of the vibrations of the transmission shaft.

Figure 8A:
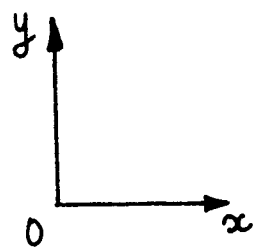
FIGS. 8A, 8B and 8C are diagrams, similar to those of FIGS. 6A, 6B and 6C, for an embodiment of a support bearing in which the length at rest of the strips is greater than the distance between the edges which they connect.
Figure 8A:
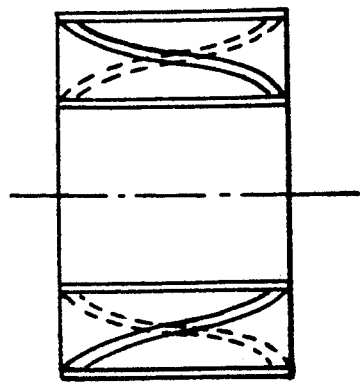

FIG. 8A shows diagrammatically a support bearing, the elastic strips of the two series of which are not tensioned between the two rings of the bearing, that is to say the length at rest of each of the elastic strips is greater than the distance separating the two edges which it connects.

Figure 8B:
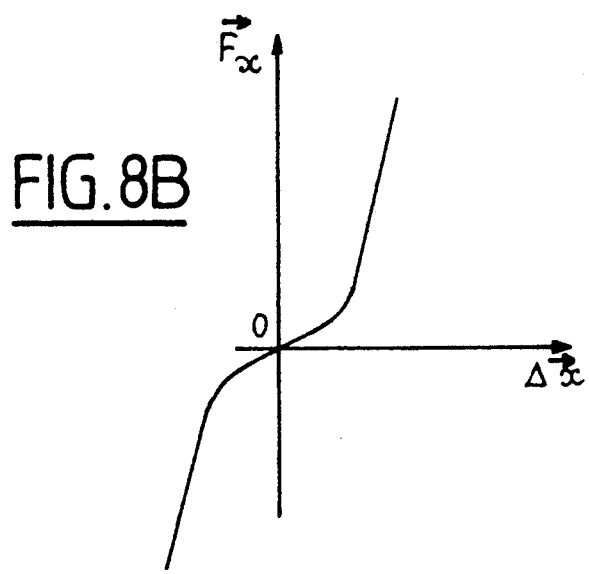
Figure 8C:
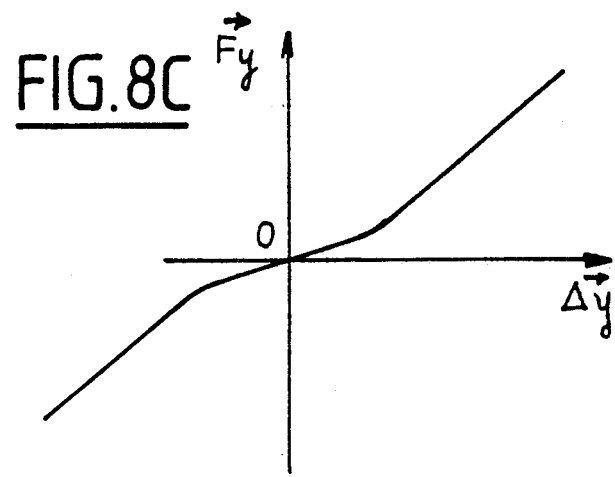

In this case, on the basis that the angle of the midplane of each of the strips is substantially equal to 30°, the characteristic curves shown in FIGS. 8B and 8C are obtained for the axial rigidity Fx and radial rigidity Fy of this support bearing. This type of bearing can be used in longitudinal transmissions where it is desirable to allow a slight axial movement of the transmission shaft within a specific range.

The invention is not limited to the embodiments just described. It is possible, for example, to vary the number of elastic strips in each of the two series. It is also possible to vary their angular distributions about the common axis X—X, for example by providing several strips of the same series in succession.

It is likewise possible to ensure that two axially opposite strips, as seen in FIG. 1, do not belong to the same series and/or do not have the same geometrical and/or structural characteristics. This is feasible particularly when the support bearings according to the invention serve for ensuring the retention of a transmission shafting, the deadweight of which has to be supported in the lower part of each support bearing (as seen in the figures).

Moreover, the elastic strips and the inner and outer rings can be produced from any material, such as metal, plastic, thermoplastic, elastomer, composite material, etc. The same support bearing can also have strips produced from different materials.

Where different materials are concerned, the connections between the elastic strips and the rings can be made by adhesive bonding, glueing, welding, etc.

Furthermore, the angles formed by the strips of the same series can vary about the axis X—X and also need not be equal to those of the corresponding strips of the other series, especially in order where appropriate, to obtain different axial rigidities in the axial direction of stress of the bearing.

Finally, it will be seen that the support bearing produced according to the invention also allows a considerable reduction in the overall diametral dimensions of the bearings in relation to the conventional designs with elastomeric blocks. This saving in terms of the overall diametral dimensions can be very great if materials with high moduli of elasticity are used to produce the elastic strips.

It is possible to organise the form of the inner or outer rings in such a way that a plastic or elastomeric stop limits the axial or radial movements of the bearing.

I claim:

1. Support bearing of a rotary shaft, of the type comprising an inner ring (12) and an outer ring (10) coaxial with one another and elastic connecting means (14a, 14b) between the two rings, characterized in that the connecting means comprise a series of first elastic strips (14a) which connect a first edge (10a) of the outer ring

(10) to an axially opposite first edge (12a) of the inner ring (12), in such a way that the mid-plane of each of the first strips (14a) forms a first angle (A) with the axis (X—X) common to the two rings, and a series of second elastic strips (14b) which connect the second edge (10b) of the outer ring (10) to the second edge (12b) of the inner ring (12), in such a way that the mid-plane of each of the second strips forms a second angle (B) with the said common axis (X—X).

2. Support bearing according to claim 1, characterized in that each of the two series of elastic strips (14a, 14b) comprises an identical number of elastic strips.

3. Support bearing according to claim 2, characterized in that the strips (14a, 14b) of each of the two series alternate angularly about the said common axis (X—X).

4. Support bearing according to claim 1 characterized in that the first elastic strips (14a) and second elastic strips (14b) are distributed uniformly about the said common axis (X—X).

5. Support bearing according to claim 1, characterized in that at least one of the two series of strips has at least one group of several strips arranged consecutively about the said common axis.

6. Support bearing according to claim 1, characterized in that the first angle (A) and the second angle (B) are equal.

7. Support bearing according to claim 1, characterized in that the first angle (A) and the second angle (B) are different.

8. Support bearing according to claim 1, characterized in that each strip has a length at rest which is equal to the distance separating the two edges which it connects.

9. Support bearing according to claim 1, characterized in that each strip has a length at rest which is greater than the distance separating the two edges which it connects.

10. Support bearing according to claim 1, characterized in that the strips and the rings are produced from the same material.

11. Support bearing according to claim 10, characterized in that the strips and the rings are produced in one piece.

12. Support bearing according to claim 1, characterized in that the said connecting means also comprise at least one series of hydro-elastic chocks (26) which connect the mutually confronting cylindrical surfaces of the two rings to one another.

13. Support bearing according to claim 12, characterized in that each of the hydro-elastic chocks is arranged between two consecutive elastic strips (14a, 14b).

14. Support bearing according to claim 1, characterized in that it possesses elastic stop means for limiting the relative movements between the inner and outer rings.

* * * * *